(12) United States Patent
Kokumai

(10) Patent No.: US 7,552,330 B2
(45) Date of Patent: Jun. 23, 2009

(54) MUTUAL AUTHENTICATION SYSTEM BETWEEN USER AND SYSTEM

(75) Inventor: Hitoshi Kokumai, Kobe (JP)

(73) Assignee: Mnemonic Security Limited, Osaka (JP)

( * ) Notice: Subject to any disclaimer, the term of this patent is extended or adjusted under 35 U.S.C. 154(b) by 0 days.

(21) Appl. No.: 10/569,115

(22) PCT Filed: Aug. 23, 2004

(86) PCT No.: PCT/JP2004/012436

§ 371 (c)(1),
(2), (4) Date: Feb. 22, 2006

(87) PCT Pub. No.: WO2005/022396

PCT Pub. Date: Mar. 10, 2005

(65) Prior Publication Data

US 2006/0230435 A1    Oct. 12, 2006

(30) Foreign Application Priority Data

Aug. 27, 2003    (JP) .............................. 2003-302401

(51) Int. Cl.
*H04L 9/00* (2006.01)
*H04K 1/00* (2006.01)
(52) U.S. Cl. .................. 713/169; 713/183; 713/185
(58) Field of Classification Search .................. 713/169
See application file for complete search history.

(56) References Cited

U.S. PATENT DOCUMENTS

| | | | |
|---|---|---|---|
| 5,434,918 A * | 7/1995 | Kung et al. .................. 713/169 |
| 5,872,917 A * | 2/1999 | Hellman ........................ 726/6 |
| 7,073,067 B2 * | 7/2006 | Mizrah ........................ 713/183 |
| 7,100,049 B2 * | 8/2006 | Gasparini et al. ........... 713/170 |

(Continued)

FOREIGN PATENT DOCUMENTS

| JP | 7-236006 | 9/1995 |
|---|---|---|
| JP | 2003-228553 | 8/2003 |

OTHER PUBLICATIONS

IBM Technical Disclosure: A strong client-server mutual authentication. Jan. 1, 1999. IBM. p. 1-4.*

(Continued)

*Primary Examiner*—Christian LaForgia
(74) *Attorney, Agent, or Firm*—William L. Androlia; H. Henry Koda

(57) ABSTRACT

An effective means for system authentication by a user.

A system is characterized by connecting an electronic apparatus on the system management side to a terminal on the user side via a communication line including the internet and, using system authentication information recorded on a recording medium included in the electronic apparatus on the system side and personal authentication information entered through a personal input operation on a user-operated terminal, for mutual authentication between the user and the electronic apparatus on the system management side that is accessed.

In the mutual authentication system between the user and the system, two sets of authentication data are registered: one set is personal authentication data indicating the personal authentication information on the user and other set is server authentication date indicating the system authentication information.

The system is characterized in that server side authentication using the server authentication date and user side authentication using authentication data of the user are performed alternatively.

7 Claims, 13 Drawing Sheets

U.S. PATENT DOCUMENTS

| | | | |
|---|---|---|---|
| 7,124,433 B2* | 10/2006 | Little | 726/2 |
| 7,174,462 B2* | 2/2007 | Pering et al. | 713/182 |
| 7,188,314 B2* | 3/2007 | Mizrah | 715/741 |
| 7,219,368 B2* | 5/2007 | Juels et al. | 726/2 |
| 7,266,693 B1* | 9/2007 | Potter et al. | 713/169 |
| 7,346,775 B2* | 3/2008 | Gasparinl et al. | 713/170 |
| 2003/0093699 A1* | 5/2003 | Banning et al. | 713/202 |
| 2004/0030934 A1* | 2/2004 | Mizoguchi et al. | 713/202 |
| 2004/0093527 A1* | 5/2004 | Pering et al. | 713/202 |
| 2006/0020815 A1* | 1/2006 | Varghese et al. | 713/182 |

OTHER PUBLICATIONS

"Fukusu no E de Password", Gekkan e. Columbus, Toho Tsushinsha, Dec. 29, 2002, vol. 29, No. 1, p. 71.

Hitoshi Kokumai, "Personal identification by memory verification", The Institute of Electronics, Information and Communication Engineers, Nov. 6, 2000, vol. 100, No. 421, pp. 81-87.

Ryo Katsuta et al., "Authentication System using Graphical password", Information Processing Society of Japan, Feb. 15, 2002, vol. 2002, No. 12, pp. 91-96.

Paulson, L.D., "Taking a Graphical Approach to the Password", Computer, 2002, vol. 35, No. 7, p. 19.

Mendori, T. et al., "Password Input Interface Suitable for Primary School Children", Proceedings of International Conference on Computers in Education, 2002, Dec. 2002, vol. 1, pp. 765-766.

* cited by examiner

PASS SYMBOL REGISTRATION PHASE (PASSWORD AUTHENTICATION SUCCESSS)

PASS SYMBOL REGISTRATION PHASE (PASSWORD AUTHENTICATIONFAILURE)

MUTUAL AUTHENTICATION SYSTEM BETWEEN USER AND SYSTEM

TECHNICAL FIELD

The present invention relates to a mutual authentication system between a user and a system. For example, the present invention relates to the authentication system of the user in a system management device (a data management center, a sales management center, a server for electronic commercial transaction and retrieval of the information or the like) connecting an electronic apparatus at the system management side and a terminal device at the user side via a communication path including Internet.

BACKGROUND ART

As individual authentication methods, password authentication and biometrics authentication are known.

The password authentication is a simple authentication method as a system and widely used these days. From a viewpoint of the cognitive psychology, this method is categorized as a method of "retrieving" and "reproducing" a meaningless symbol memory or a "semantic memory", a memory that is not accompanied by experience, from memory storage information in the human brain.

However, as already known as a problem of passwords, reproduction of meaningless symbols or a memory without experience is difficult for a person with a weak memory, especially for an elderly person, and easily leads to an errornous reproduction.

Converting simple numbers or symbols into a semantic memory and memorizing as the semantic memory, typically using the birth date as a password, is a common practice employed in order to avoid such a drawback. However, examples of the conversion of numbers into a semantic memory are extremely limited for most people, to the birth dates or the like, and damages from spoofing by a third person could be easily caused.

In order to minimize the damage occurring when a password is stolen, it is desirable to use a different password for a different authentication medium. However, because it is difficult to memorize, recall, and reproduce the passwords corresponding to the respective authentication media, it is often the case that these passwords are written down in a notebook and such. As a result, when the notebook and such is stolen, all of the passwords are stolen.

The latter, i.e., the biometrics authentication, uses physiological information inherent in a user, so that the biometrics authentication can advantageously prevent the information from being forgotten or lost. However, since the information is unique to the user, it is not possible to use different user authentication information for each recording medium. Thus, it is not possible to use different user authentication information for each recording medium. Thus, there are problems that, when the user authentication information is stolen, all the authentication media are damaged, and alternative person authentication information can be disadvantageously very difficult to be obtained.

In addition, an input device is newly required to read physiological information. Furthermore, because inputted information changes depending on input/read conditions, there is a problem that a so-called user rejection ratio, which indicates rejection of an authenticated user, occurs at a predetermined probability. In addition, when the barrier for checking is lowered to reduce the rejection probability, the probability of spoofing of the user by a third person increases. A trade-off relationship between the user rejection ratio and the spoofing probability by a third person is an inevitable problem.

The inventor of the present invention filed an application for an invention as Japanese Patent Application No. 2002-25110 (Japanese Patent Application Laid-Open No. 2003-228553). This invention was contrived with an object of facilitating the memory of the personal information and of hindering the spoofing probability by a third person in an attempt to solve the above noted problems of the password authentication, and with a further object, in an attempt to solve the above noted problem of the biometrics authentication, of allowing to change person authentication information for each recording medium, and of simplifying the input and reading mechanism, as well as of reducing the user rejection ratio and improving the protection against the spoofing probability by a third person.

This invention of the prior application relates to a technology of an image using type person authentication system and in place of the password authentication and the biometrics authentication, the image information is defined as authentication means.

The person authentication system only covers the user side and the server side only authenticates a normal user and accepts it excluding "a pretending user".

However, with the increasing number of Net crimes, growing is the recognition that the user authentication on the system side is not sufficient and the system on the user side is also necessary. Authentication of the system by a terminal owned or controlled by the user has already been put into practice. However, an effective technology of "system authentication by the user" for directly authenticating the system without relying on the terminal under the condition that the user himself or herself cannot rely on the terminal is yet to be developed.

DISCLOSURE OF THE INVENTION

Problems to be Solved by the Invention

Therefore, an object of the present invention is to provide effective means against "the system authentication by the user".

Further, an object of the present invention is to obtain a technology of organic and overall "mutual authentication between a person and a system" that is integrated to the image using type personal authentication system method of the prior invention.

Means for Solving the Problems

The present invention provides a mutual authentication system in which an electronic apparatus at a system management side and a terminal device at the user side are connected via a communication path including Internet, and mutually authenticate a user and the electronic apparatus at the system management side as a target of access by using the system authentication information from a recording medium that is incorporated in the electronic apparatus at the system side and the personal authentication information from a personal input operation of the terminal device operated by the user, wherein two sets of data for authentication are registered, one of the sets being data for personal authentication indicating personal authentication information of the user, and the other set being data for server authentication indicating system authentication information, and the authentication at the server side using the data for the server authentication and the authentication at the user side using the data for the personal authentication of the user are alternately performed.

Effects of the Invention

In the mutual authentication between the person and the system, the present invention may enhance a counter measure against leak of the information by removing "the spoofing user" and carrying out the system authentication by the user side at the same time as the user authentication by the system side to authenticate only the normal user and receive it at the system management system (the server).

In addition, the present invention which is not limited to the terminal owned by the user and managed by the user is effective as a technology of "system authentication by a person (a user)" to directly authenticate the system without relying on the terminal under the condition that the user himself or herself cannot rely on the terminal.

BRIEF DESCRIPTION OF THE DRAWINGS

FIGS. 2A to 2D are explanatory views of the displayed content on a display screen of a user side electronic apparatus (a terminal device); FIG. 2A shows an authentication preliminary stage; FIG. 2B shows a first authentication stage; FIG. 2B shows a second authentication stage; FIG. 2C shows a third authentication stage; and FIG. 2B is an Nth authentication stage.

FIG. 9-1 is a sequence of an authentication symbol registration phase (when the password authentication succeeds).

FIG. 9-2 is a sequence of an authentication symbol registration phase (when the password authentication fails).

FIG. 11-1 is the sequence of the mutual authentication phase (when the authentication fails).

FIG. 11-2 is the sequence of the mutual authentication phase (when the authentication fails).

BEST MODE FOR CARRYING OUT THE INVENTION

According to the preferred embodiment of the present invention, connecting an electronic apparatus at a system management side (a terminal device) to a terminal device at the user side via a communication path including Internet, a user and the electronic apparatus at the system management side that is a target of access are mutually authenticated by using the system authentication information due to a recording medium that is incorporated in the electronic apparatus at the system side and the personal authentication information due to the input operation of the person by the terminal device that is operated by the user.

The present invention provides a mutual authentication system of the authentication at the system management side and the user personal authentication, wherein, upon the mutual authentication of the individual authentication and the authentication at the side of the authentication side, two kinds of plural reference symbols are registered and set, respectively, for the mutual authentication (one set is the data for the personal authentication and the other set is the data for the system authentication); and the authentication of a system management electronic apparatus due to the data for the system authentication of an authentication management electronic apparatus and the personal authentication of the user due to the data for the authentication of the user are alternately effected.

According to the screen and image using type person recognition technology, the system side determines and confirms that "the system and the person share a memory of an object of vision (a symbol)". If the person determines and confirms the same sharing of the memory of the object of vision, this is the authentication of the system by the person.

For the mutual authentication, two sets of symbols are registered when setting the registration of the reference symbol (the same number is preferable).

One set is the data for the personal authentication and the other set is the data for the server authentication of "system authentication by a person".

From the same screen, two may be continuously selected and registered or each of them may be registered from the different screens. Particularly, with respect to the data for the server authentication, another set of symbols may be brought not from the existing screen for authentication but from the other screen (any one is available, which includes a Chinese character and is an object of viewing and can be confirmed not by the difficult "reproduction" of a memory but by more simple "reconfirmation")

EMBODIMENT

Hereinafter, the present invention will be described in detail according to the embodiment with reference to the drawings.

Figure 1:
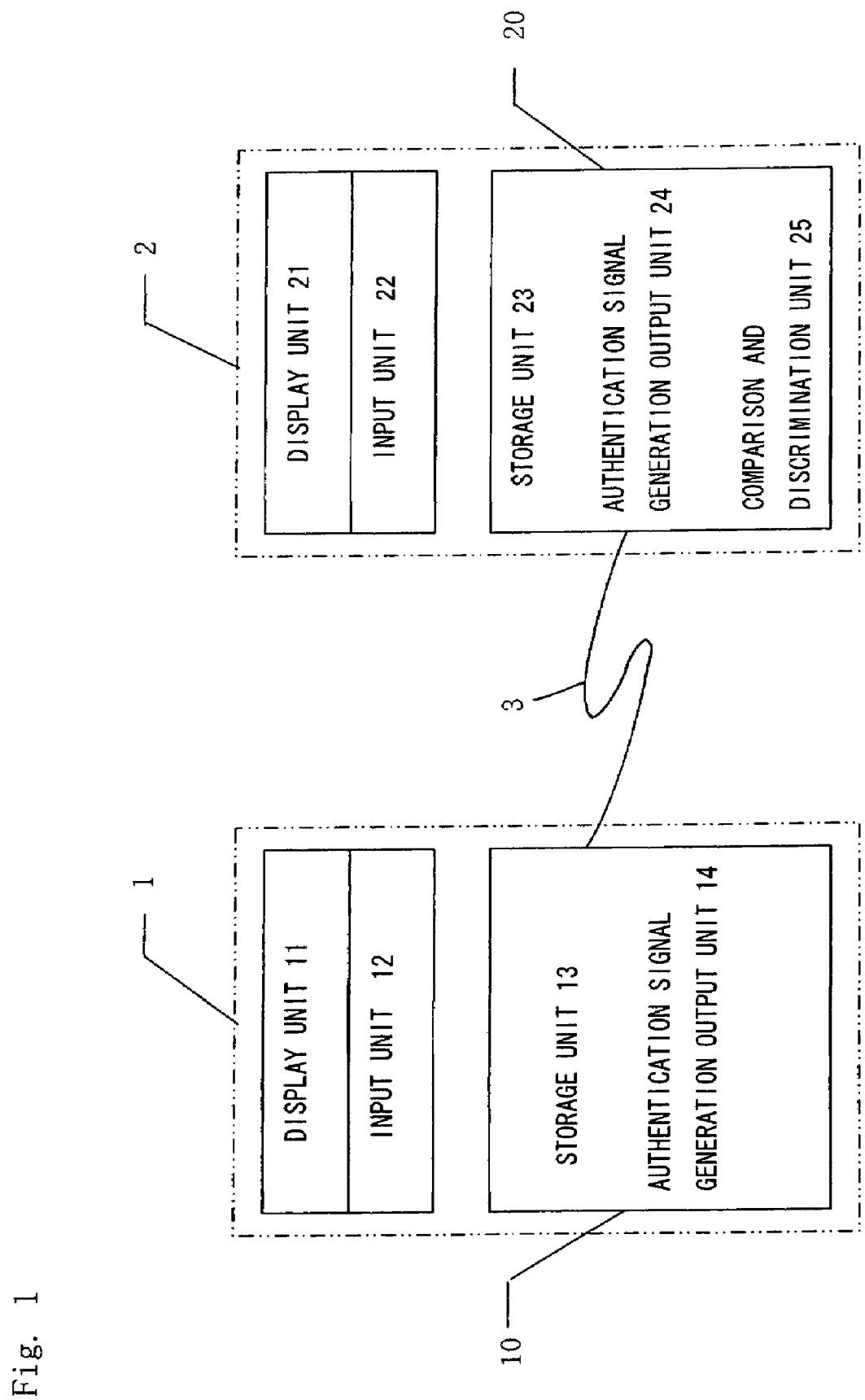
FIG. 1 is a block diagram showing the outline of a mutual authentication system according to the present invention.

With reference to FIG. 1, a terminal device on the user side (a client terminal) 1 and an electronic apparatus on the server side (a Web server) 2 are connected via Internet 3.

The terminal device on the user side 1 has a display unit 11, an input device 12, and a computer 10, and the electronic apparatus on the server side 2 has a display unit 21, an input device 22, and a computer 20.

The computer 10 of the terminal device on the user side 1 is provided with the functions as a storage unit 13 and an authentication signal generation output device 14. A computer 20 of the electronic apparatus on the server side 2 is provided with the functions as a storage unit 23, a comparison and discrimination device 25, and an authentication signal generation output device 24.

On a display unit 1' of the terminal device on the user side (the client terminal) 1, an image for a user authentication by a system, namely, a UPS assembly (K) for selecting a user authentication symbol UPS and an image for a system authentication, namely, a system authentication symbol SPS are displayed.

According to the embodiment, the user authentication symbol UPS and the system authentication symbol SPS are made into an image using type reference symbol together.

FIGS. 2A to 2D show the screen of the display unit 1' of the terminal device on the user side (the client terminal) 1. FIG. 2A shows an authentication preliminary stage and at the right lower part of the screen, the UPS assembly (K) (16 symbol groups including the user authentication symbol UPS).

FIG. 2B shows a first authentication stage. In addition to the UPS assembly (K) (16 symbol groups including the user authentication symbol UPS) at the right lower part of the screen, one system authentication symbol SPS, namely, "A1" is displayed on the left upper part of the screen.

FIG. 2C shows a second authentication stage. As compared to FIG. 2B, adding one system authentication symbol SPS, namely, "A2", two system authentication symbols SPS, namely, "A1" and "A2" are displayed on the left upper part of the screen.

FIG. 2D is a Nth authentication stage (the last authentication stage) and N pieces of the system authentication symbols SPS, namely, "A1", "A2", . . . , and "An" are displayed on the left upper part of the screen.

With reference to FIGS. 3 to 6, the access and authentication procedure will be described.

Figure 3:
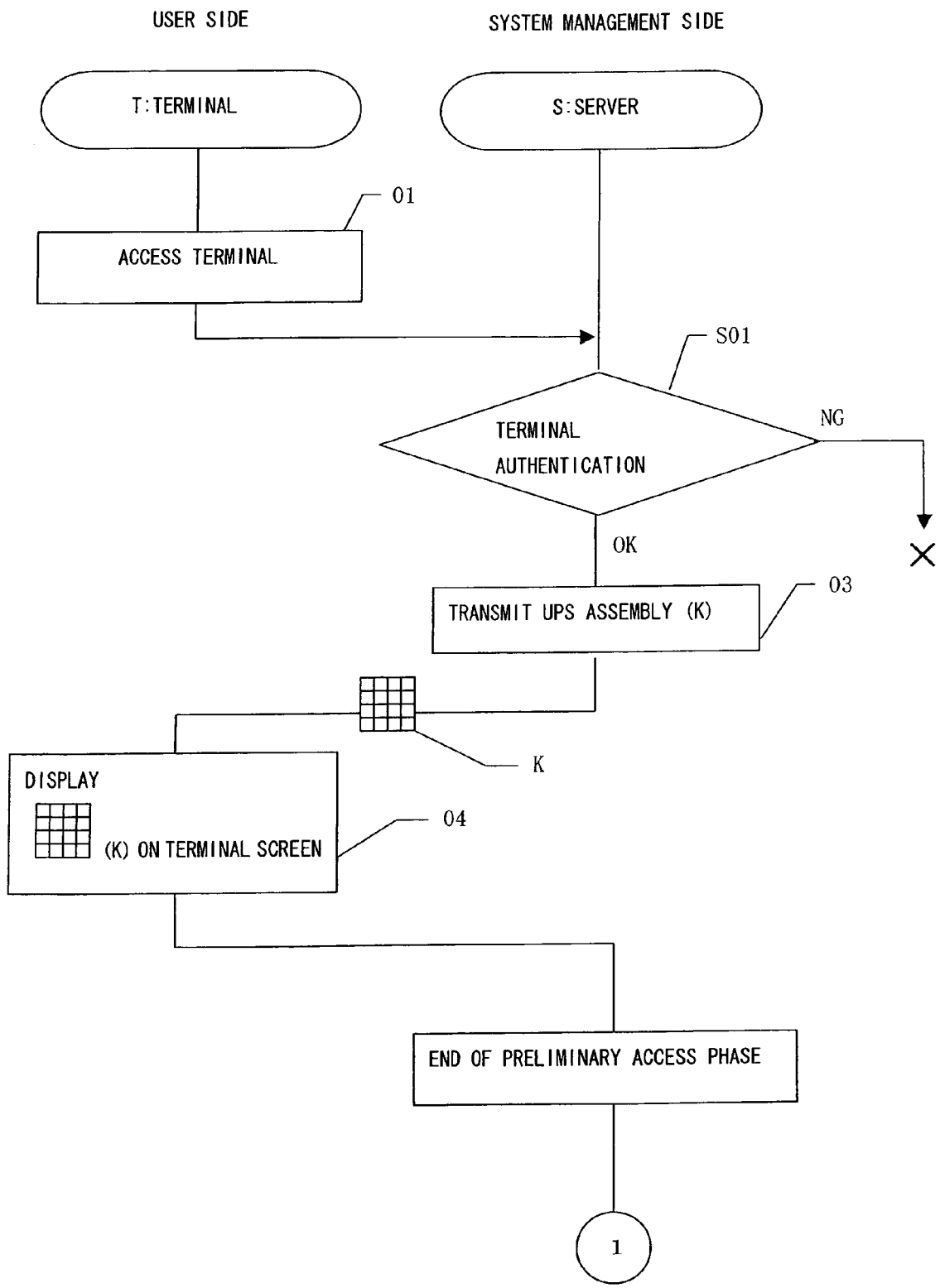
FIG. 3 is a flow chart showing a processing flow of the first authentication stage.

With reference to FIG. 3, in the authentication preliminary stage:

a: a user U tries to access (01), for example, from an unauthenticated terminal T controlled by the other person, b: in step S1, a server S authenticates the terminal T according to a technology for authenticating an apparatus using an encryption such as PKI, c: the server S transmits the symbol assembly K for selecting the UPS assembly for the user authentication to the user U (03), and d: the symbol assembly K is displayed on the screen 1' of the display unit of the terminal device at the user side 1 (04).

Figure 4:
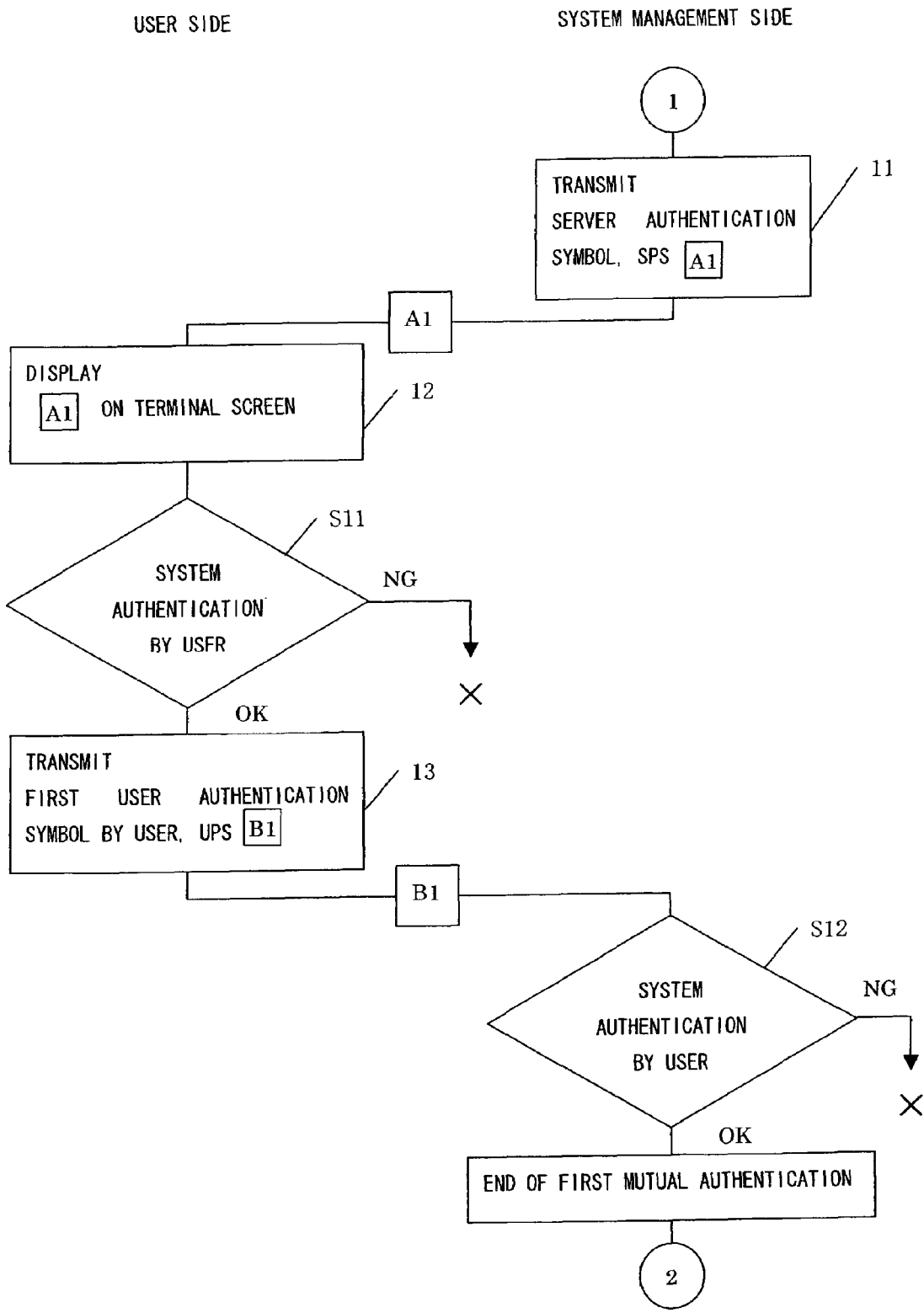
FIG. 4 is a flow chart showing a processing flow of the second authentication stage.

With reference to FIG. 4, in the first authentication stage:

a: the server S transmits ""A1" for the first authentication of "the system authentication pass symbol (SPS)" to the terminal T at the user authentication side (11), b: "A1" is displayed on the left upper part of the screen 1' of the display unit of the terminal device at the user side 1 (12), c: Instep S11, the user authenticates ""A1" for the first authentication of "the system authentication pass symbol (SPS)" by the terminal T—the first system authentication, d: The user selects "B1" as the symbol for the first user authentication from "the symbol assembly K" on the right lower part of the screen 1' of the display unit and transmits the selected symbol (13), and e: In step S12, the system authenticates ""B1" for the first authentication of the user authentication pass symbol (UPS)"—the first user authentication.

Upon establishment of step S12, the first mutual authentication has been completed.

Figure 5:
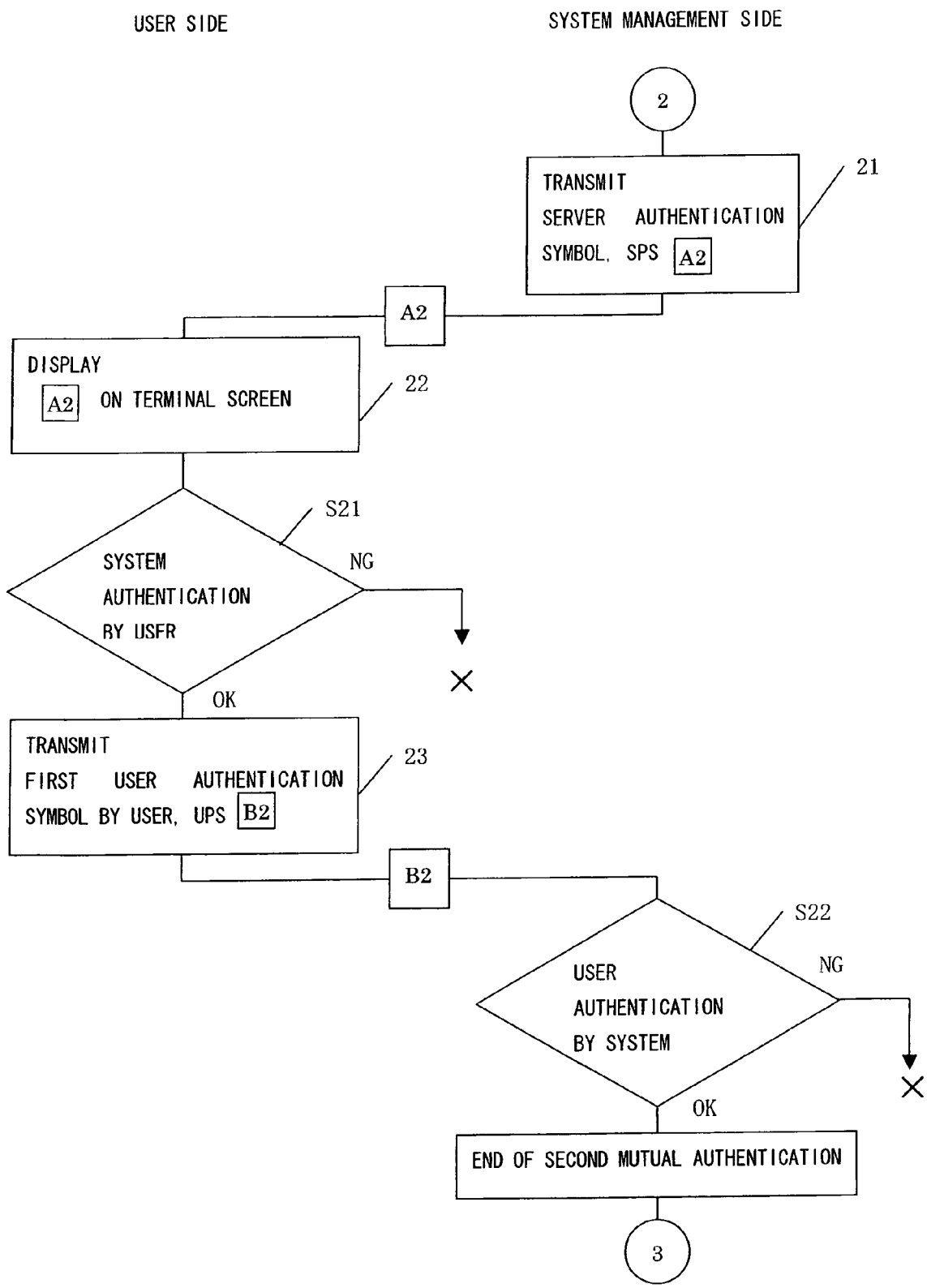
FIG. 5 is a flow chart showing a processing flow of the third authentication stage.

With reference to FIG. 5, in the second authentication stage:

a: the server S transmits ""A2" for the second authentication of the system authentication pass symbol (SPS)" to the terminal T at the user authentication side (21), b: "A2" is additionally displayed on the left upper part of the screen 1' of the display unit of the terminal device at the user side 1 (22), c: in step S21, the user authenticates ""A2" for the second authentication of the system authentication pass symbol (SPS)" by the terminal T—the second system authentication, d: the user selects "B2" as the symbol for the second user authentication from "the symbol assembly c" on the right lower part of the screen 1' of the display unit and transmits it (23), and e: in step S22, the system authenticates ""B2" for the second authentication of the user authentication pass symbol (UPS)"—the second user authentication.

Upon establishment of step S22, the second mutual authentication has been completed.

In the same manner as in the above, the mutual authentication to the N-1 times is repeated, and the (N-1)th mutual authentication is completed.

Figure 6:
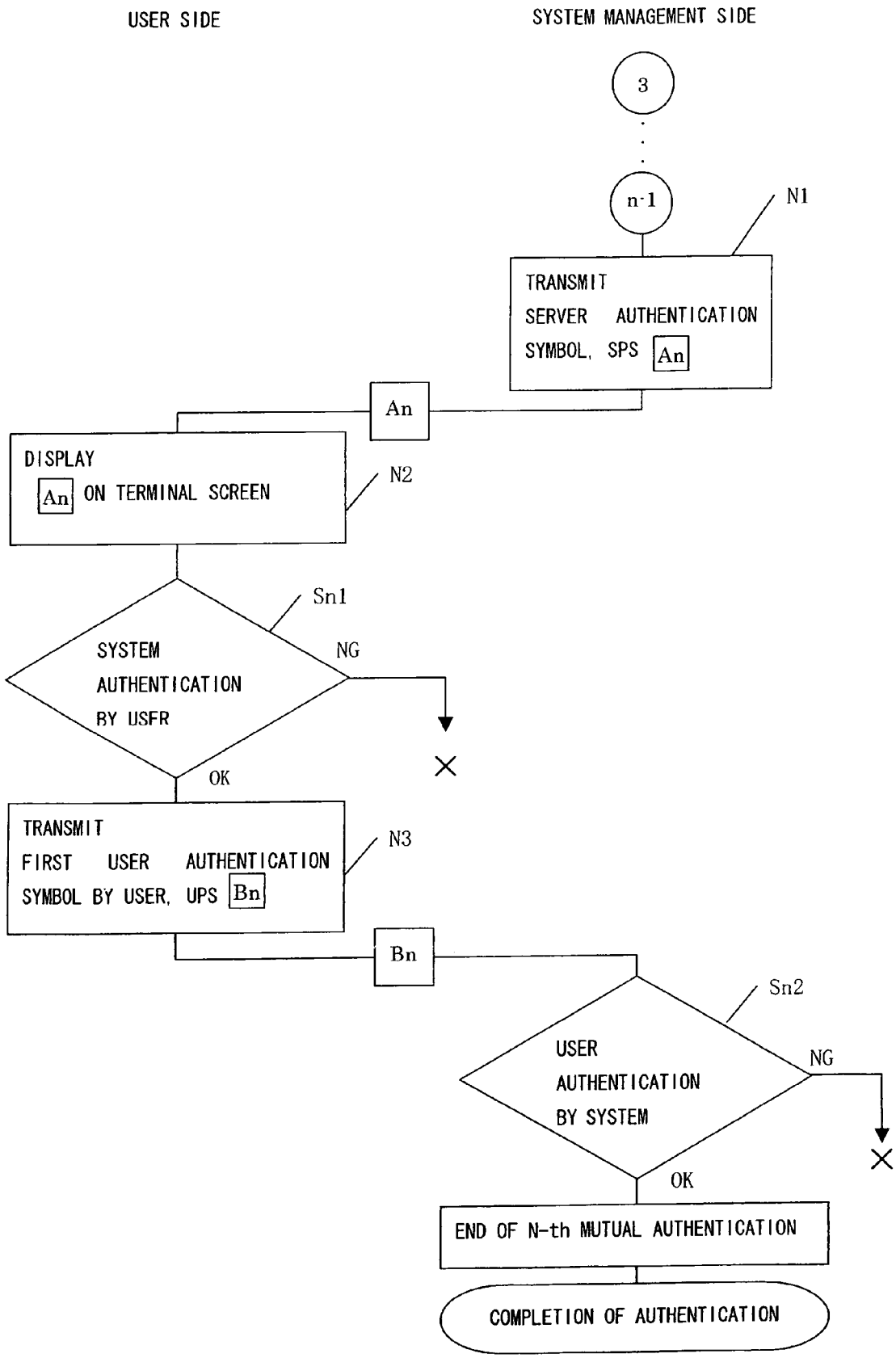
FIG. 6 is a flow chart showing a processing flow of the Nth authentication stage.

With reference to FIG. 6, the Nth authentication stage:

a: the server S transmits ""An" for the second authentication of the system authentication pass symbol (SPS)" to the terminal 1 at the user authentication side (N1), b: "An" is additionally displayed on the left upper part of the screen 1' of the display unit of the terminal device at the user side 1 (N2), e: in step Sn1, the user authenticates ""An" for the Nth authentication of the system authentication pass symbol (SPS)" by the terminal T—the Nth system authentication, f: the user selects "Bn" as the symbol for the Nth user authentication from "the symbol assembly K" on the right lower part of the screen 1' of the display unit and transmits it (N3), and g: in step Sn2, the system authenticates ""Bn" for the Nth authentication of the user authentication pass symbol (UPS)"—the Nth user authentication.

Upon establishment of step Sn2, the second mutual authentication has been completed.

Upon completion of the Nth mutual authentication, the authentication is established (for example, the user is allowed to connect to the electronic apparatus for the electronic commercial transaction).

In the above process of the authentication, with the functions of the discrimination device 25 and the storage unit 23 of the computer 20 of the electronic apparatus on the server side 2, "A1" corresponding to ID from the terminal is transmitted from the system authentication symbol SPS that is registered in the storage unit, and further, the authentication in step S12 is carried out comparing the user authentication symbol UPS: "B1" from the terminal with a user authentication symbol UPSP: "B1'" that is recorded in the storage unit 23 of the computer 20. The same applies on and after the second authentication stage.

The case that each authentication stage is not established and the case that each authentication stage is established will be described below.

In the authentication preliminary stage, failure of establishment of "step S01" means that there is a risk of leakage of the data from the terminal that is not reliable. If possible, the message indicating that there is a risk of leakage of the data from the terminal that is not reliable from the server S, the communication from the server S is interrupted. As one kind of the viewable message that can easily present failure of authentication to the user, garble to disturb the screen on purpose or the like is conceivable.

With respect to establishment of "step S12" at the first authentication stage:

When one of SPS registered by the user U is presented, estimating that the server S is a true server, the user U continues the process and proceeds to the next step.

With respect to failure of establishment of "step S12" at the first authentication stage:

When nothing is presented or an unknown symbol is presented, determining that the server S is imitation (the terminal T is also imitation), the user U cuts the communication.

With respect to the establishment of the first authentication stage:

Receiving the first one of the right UPS from the user U, the server S determines that a probability that the server S is a true server is higher than a probability that the server is imitation to allow continuing of the process, and then, the server S proceeds to the second authentication stage.

The first authentication stage 3 is not established (the server S does not receive the first one of the right UPS from the user U. The user U who thinks click error causes this may be allowed to try to receive it twice or three times). Determining that the user U is the pretending user, the server S may cut the communication (in this case, the authentication screen K and one of SPS have flowed out to the user U).

In "step S22" of the second authentication stage, the server S correctly presents the second one of SPS, namely, "A2" to the user U. Determining that the probability that the user U is the true server S is further higher, the server S may proceed to the next stage.

The server authentication is not established (the server S does not present the second one, "A2" correctly). The user U determines that the server S is imitation and then, the user U cuts the communication (in this case, one of SPS have flowed out to the imitation server).

The second authentication stage is established (the server S receives the second one of the correct UPS). The server S strongly estimates that the user U is a true user and continuing the processing, the server S proceeds to the third authentication stage.

As described the above, repeating the processing by the registered number of times, the mutual authentication has been completed in the case that the server S and the user U mutually receive the correct symbols till the last. The server S which cannot present the correct SPS in the middle of the procedure is determined as the imitation server S by the user at that time. In the same way, the user U who cannot the correct UPS is determined as the pretended user U by the server S at that time. In each case, the processing is interrupted by the user U or the server S immediately.

As a result, only the true server S may accept the access of the true user U to allow only the true user U to access the true server S.

Assuming that the imitation server S can deceive the true user U, according to the present invention, it is not impossible logically that a third person who can repeatedly act the pretended user U and the imitation server S by the number of SPS and UPS (without noticed by the true user U) gets the UPS of the true user U finally. However, it is nearly impossible in a practical manner because the user who takes notice of that one or two UPS are stolen by the imitation server S at the point of time when the first authentication stage of the second authentication stage is not established can take a defense action to delete or newly register SPS and UPS by accessing the true server S from the reliable terminal T that has been authenticated and is managed by the user himself or herself located at home or his or her office (that can remove the imitation server S by PKI or the like).

According to the present invention, it is not assumed that the user U is self-destructive enough to try accessing from the unauthenticated terminal T even when the first authentication stage or the second authentication stage has not been established (in other words, even when the user knows that the imitation server S that intends to deceive the user with the stolen SPS/UPS behind the terminal T that is not authenticated and is managed by the other person).

Figure 2:
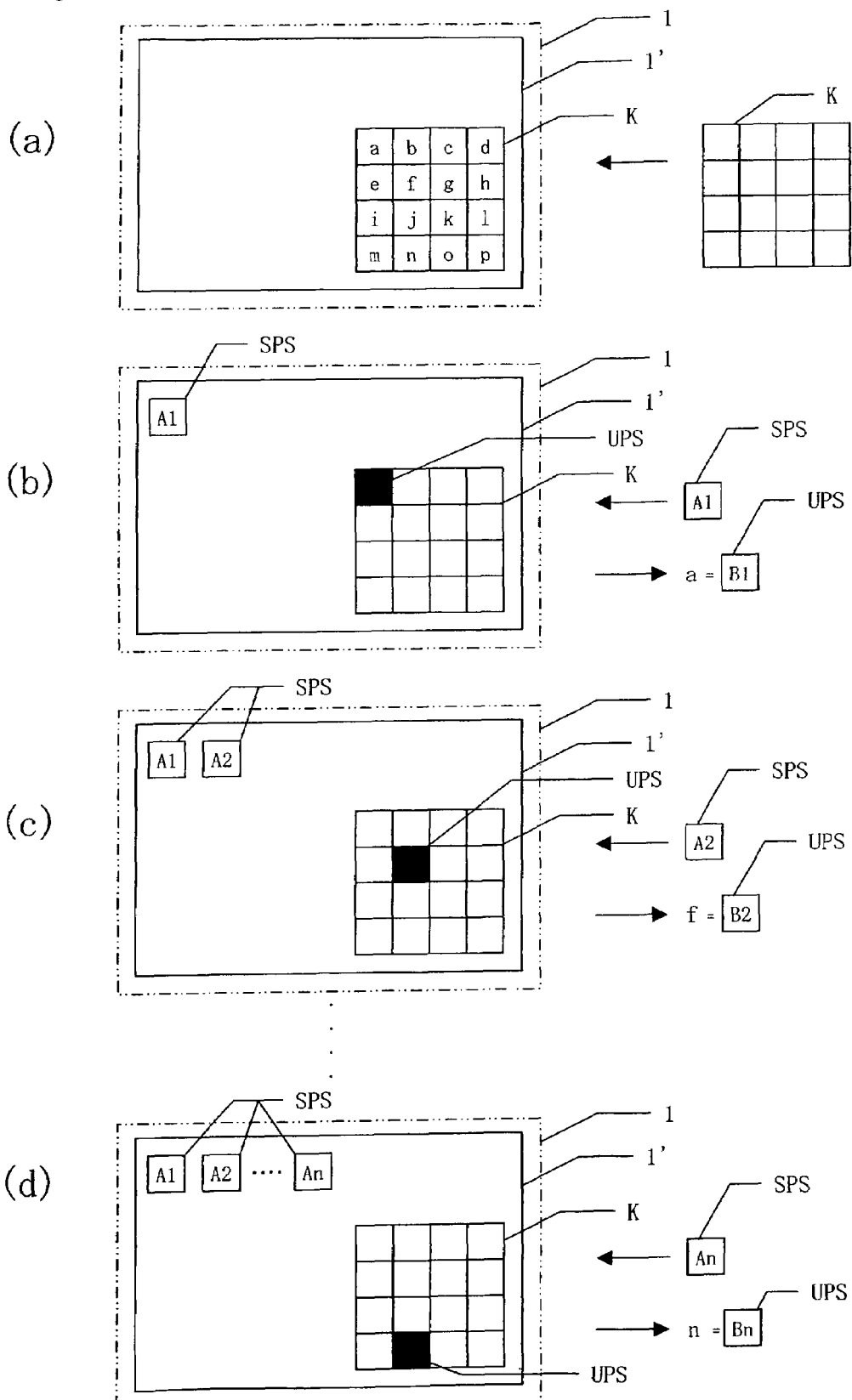

According to the embodiment of the present invention, the UPS assembly (K) at the right lower part of the screen in FIG. 2 (16 user authentication symbols UPS (the true and the decoy assemblies) and the system authentication symbol SOS displayed at the left lower part: "A1", "A2", ...) is defined as the image information.

Figure 7:
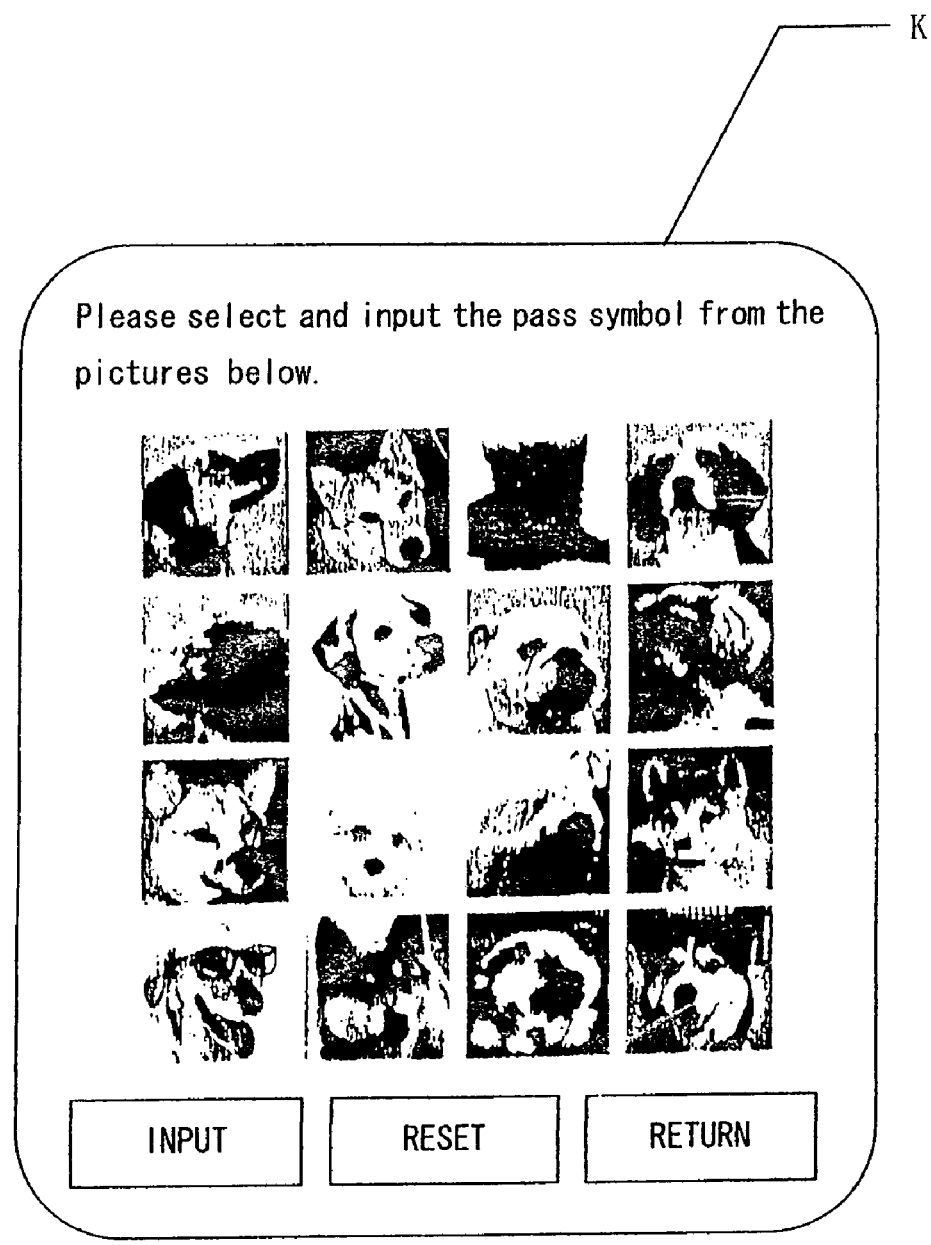
FIG. 7 is a USP assembly (K) configured by the photographs of a front face of a dog.

Particularly, with reference to FIG. 7, according to the embodiment, the all user authentication symbols are photographs of a front face of "a dog". The system authentication symbols SPS: "A1", "A2", ... and the UPS assembly (K) (16 user authentication symbols UPS (the true and decoy assemblies): abcdefghi ... [B1=a, B2=f, B3=k . . . ]) are entirely distinguished by dog types and the direction of the front face of the "dog". According to the memory of the user, the pass symbol is specified in association with a historical matter, so that the recording on paper and other storage means are not required. Therefore, the user memory authentication is reliable and leakage of the pass symbol to the third person can be prevented.

Further, it is also possible that only the UPS assembly (K) as the data for authentication of the person (16 user authentication symbols UPS (the true and decoy assemblies) is made into the image information and the system authentication symbol SPS : "A1" and "A2" may be made into the information other than the image information (for example, the alphameric character or the Chinese character information).

With respect to the above-described user memory authentication, the following invention of the prior patent application (Japanese Patent Application No. 2002-25110 (Japanese Patent Application Laid-Open No. 2003-228553) can be applied.

In the practice of the invention of the prior patent application, any information may be available as the information for authenticating the person if it is the perception information familiar to the person.

Any of the visual information such as a photograph, a picture, a drawing, and a character or the like, the auditory information such as music and common music or the like, the feeling information by raised letters and hands or the like, and the olfaction information such as aroma or the like may be available.

Among them, the visual information is especially preferable for the common healthy person. Among various perception information, the visual information has higher discriminating power and memory-retrieval and this is preferable for the general person. However, for a handicapped person, other information such as the olfaction information and the feeling information may be preferable.

In the first step of the present invention, the information familiar to the person himself or herself is registered as the authentication target information. The information familiar to the person himself or herself has been stored, so that a new memory is not needed.

The contents of the perception information are not limited, however, particularly, the information with respect to the object such as a person, a scenery, an animal, a plant, a pet, and a hobby to which the person has been familiar for a long period of time on a daily base is preferable because the memory is enhanced due to contact for a long period of time and it is stored and held in a brain as a memory for a long period of time, so that the person hardly forgets it.

Among these records for a long period of time, the intellectual information with respect to the target that has been familiar with the person at least one month or more is preferable and the intellectual information with respect to the target that has been familiar with the person for three years and more is more preferable.

Further, as the memory information, one with respect to the target that has been familiar with the person for one year or more is preferable, and the information three years ago is particularly preferable. The condition is changed depending on the age of the person, however, the oldest memory is preferable if the person is familiar therewith.

In addition, among the perception information, an episode with the past living history or the emotion of the person is preferable.

According to the cognitive psychology, the episode memory means an event (an episode) that can be located at a specific temporal and special context. On the other hand, the semantic memory is a memory is a common knowledge or a memory that can be described linguistically, for example, "a whale belongs to a mammal class".

Among the episode memories, the feeling of the person and the memory that gets engaged in the person and is important for the person in his or her life are preferable because the person hardly forgets these memories.

Further, it is desirable that the personal information is configured from at least one unit of information, preferably, two units of information, and preferably in particular, three units of information.

Furthermore, in the case that the personal information is configured by the different information, it is preferable that this information is configured by the information memorized by the user at different ages and at different places.

The different information makes it possible to enhance a barrier against the other person pretending the person who lived with the person at the same age.

Any information can be made into the "decoy information" of the no-personal information if the person is not familiar with it. However, the information clearly different from the personal information is not preferable because the barrier against the other pretended person is lowered. The information of the same concept and the different content is preferable. For example, if the personal information is a face, the decoy information is also a face, if the personal information is a scenery, the decoy information is also a scenery, and if the personal information is a dog, the decoy information is also a similar kind of dog.

In addition, it is preferable that the no-personal information can be discriminated only by the person himself or herself but cannot be discriminated by the other person. The person has such an ability. For example, it is general that parents of a duplicated twin can distinct their children, however, the others cannot do it.

Therefore, the person registration information is digitized to be shown to the person and on the basis of this, the digital synthesis and the digital correction are made by using a commercial image correction soft ware and a morphing soft ware or the like and then, it is possible to synthesize the unit information that can be sharply distinguished by the person at a certain correction point but cannot be distinguished by the others.

The registration information made of the person information and the no-personal information is necessarily configured by at least one unit and more of the personal information and at least one unit and more of the no-personal information. More preferably, the registration information made of the person information and the no-personal information is necessarily configured by two units and more of the personal information and four units and more of the no-personal information. Further, more preferably, the registration information made of the person information and the no-personal information is necessarily configured by two units and more of the personal information and seven units and more of the no-personal information.

As a method of presenting the registration information to the person, any of a method of presenting the registration information in parallel or a method of presenting the unit information sequentially is available.

In addition, in any of the parallel presentation and the sequential presentation, it is preferable that the positions of the personal information and the no-personal information are not fixed.

In this personal authentication system, determination if the personal information is selected from the registration information is made by whether the unit information as the personal information is selected, so that it is not necessary for the person to duplicate the personal information.

This is "recognition" from the aspect of the cognitive psychology and it is different from "reproduction" that is a necessary requirement in a password system.

In the case of "reproduction", if the personal information is selected well, the user can select the personal information immediately from the target information having many similar information amounts.

On the other hand, in the case of "reproduction", the information amount that can be reproduced is limited and it is limited to the very short linguistic information.

In addition, according to the embodiment of the present invention, in the preliminary stage, "the UPS assembly (K) (16 user authentication symbols UPS (the true and the decoy assemblies)" is displayed on the terminal T, however, by displaying it for each authentication stage and displaying it only upon selection of the UPS, it is possible to decrease the leakage of the information to the third person other than the user U. In addition, for each authentication stage, the content and the alignment of the UPS assembly (K) may be changed.

Figure 8:
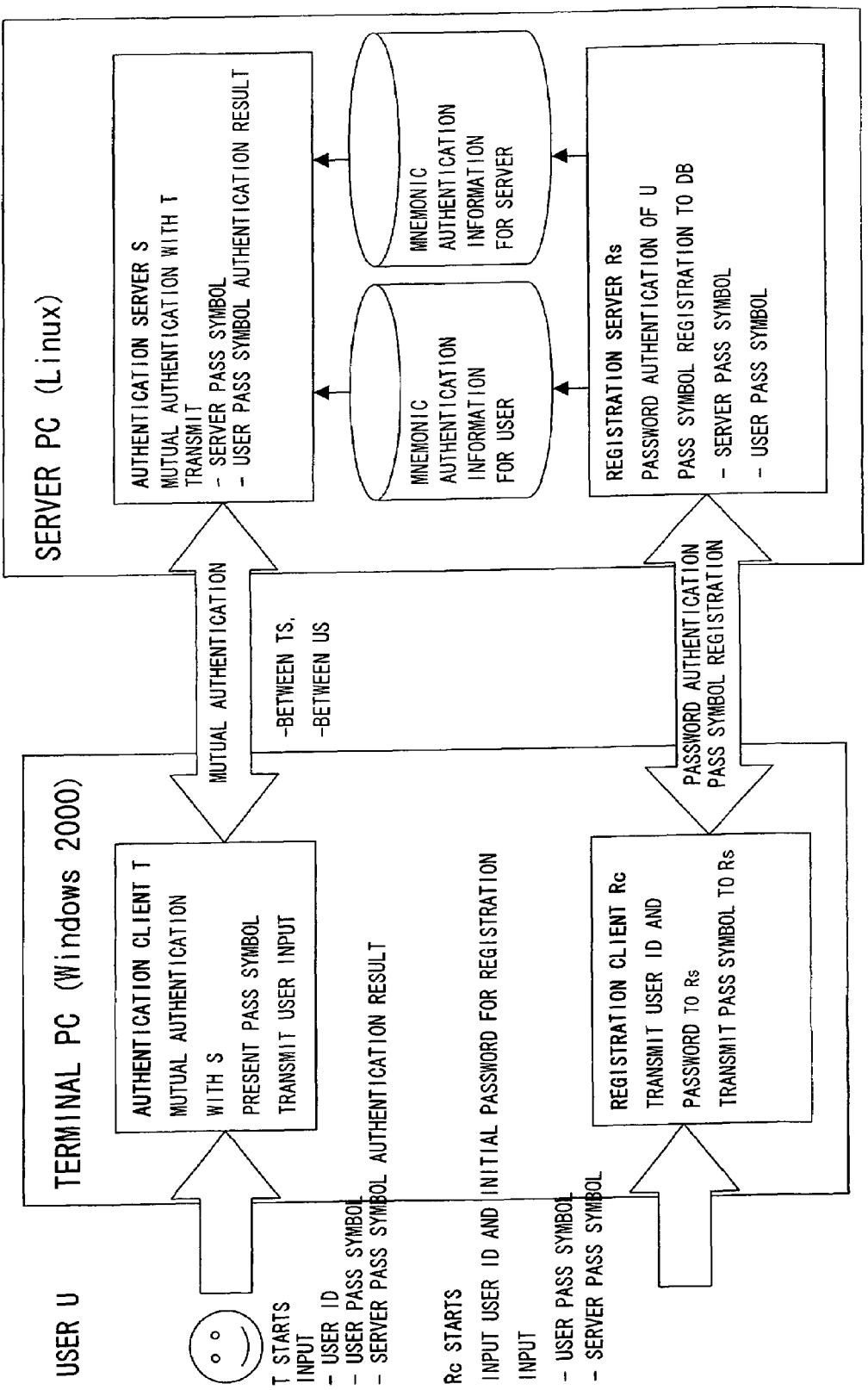
FIG. 8 is an explanatory view of the entire configuration of a mutual authentication between a user and a system.

Next, the embodiment showing the entire configuration of the mutual authentication between the user and the system for putting the present invention into practice is shown in FIG. 8.

Figures 1, 9:
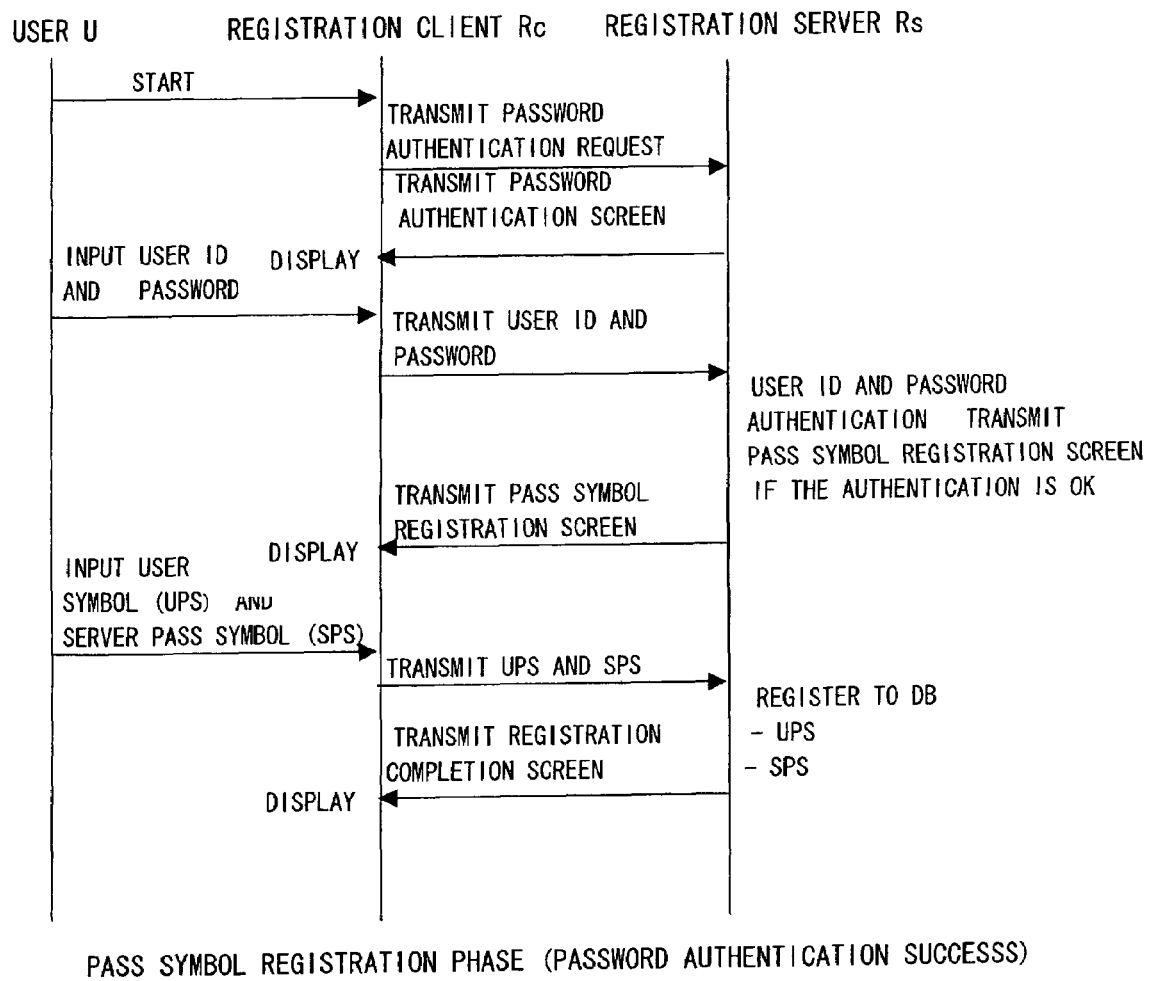
Figures 2, 9:
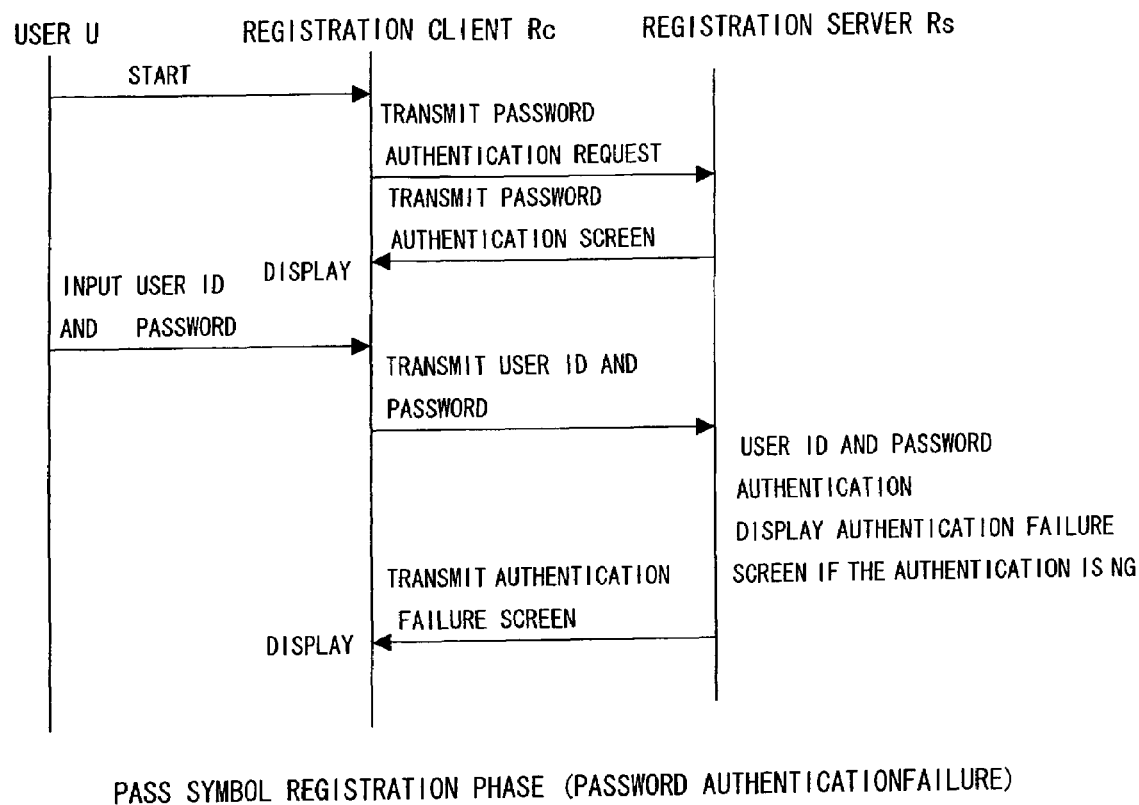

Further, FIG. 9 shows an authentication symbol registration phase. FIG. 9-1 shows the case that the password authentication succeeds and FIG. 9-2 shows the case that the password authentication fails.

In FIG. 8 and FIG. 9, the functional summary of each element is as follows.

The Authentication Server S:

Receiving a request of the mutual authentication between the server and the terminal from an authentication client T, the authentication server S carries out the mutual authentication with T. In the present system, the authentication server S carries out the mutual authentication by SSL and the establishment of the encrypted communication path between T and S.

When the mutual authentication with T is completed, the authentication server S transmits the initial screen (user ID input) to T.

Receiving a user ID from T, the authentication server S obtains the corresponding authentication information for the user from DB. At the same time, the authentication server S obtains the authentication information for the server SPS.

The authentication server S transmits the ith server authentication symbol SPS and the user authentication screen to T.

The authentication server S receives the authentication result of the ith server authentication symbol SPS and the ith authentication symbol UPS of the user.

The authentication server S checks the user authentication symbol UPS. If it is a correct answer, the authentication server S checks the authentication result of the server authentication symbol SPS, and if it is not a correct answer, the authentication server S transmits the screen of the authentication sequence failure (the user authentication failure) to T.

Checking the authentication result of the server authentication symbol SPS, if it is a correct answer, the authentication server S shifts to the i+1th authentication sequence, and if it is not a correct answer, the authentication server S transmits the screen of the authentication sequence failure (the server authentication failure) to T.

If the all sequences succeed till the registration symbol number n, the authentication server S transmits the screen of the authentication sequence success to T.

The Authentication Client T:

Activated from the user U, the authentication client T performs the mutual authentication with the authentication server S. In the present system, the authentication client T performs the mutual authentication by SSL and establishes the encrypted communication path between T and S.

Receiving the initial screen from the authentication server S, the authentication client T displays it.

Receiving input of the user ID from U, the authentication client T transmits it to S.

Receiving the ith server authentication symbol SPS and the symbol authentication screen of U from S, the authentication client T displays them on the screen.

Receiving the authentication result of the server authentication symbol SPS and the ith user authentication symbol UPS from U, the authentication client T transmits them to S.

When the screen of the authentication sequence failure (the user or the server authentication failure) is transmitted from S, the authentication client T displays this screen.

A Registration Server Rs:

Receiving a password authentication request from a registration client Rc, the registration server Rs transmits a password authentication screen to Rc.

Receiving the ID and the password of the user U who requests the authentication symbol information registration from the registration client Rc, the registration server Rs authenticates them. When the ID and the password coincide with each other, the registration server Rs transmits the authentication symbol registration screen to Rs. When they do not coincide with each other, the registration server Rs transmits the screen of the authentication failure to Rs.

Receiving the user authentication symbol information of U and the server authentication symbol information, the registration server Rs registers them in DB. After the registration is completed, the registration server Rs transmits the screen, to Rs, for notifying U of completion of the registration.

A Registration Client Rc:

Activated from the user U, the registration client Rc transmits the registration server Rs and the password authentication request.

When the password authentication screen is transmitted from Rs, displaying this screen, the registration client Rc waits until the registration authentication symbol information from U is inputted. Upon completion of the input by U, the registration client Rc transmits the user ID and the password.

When the authentication failure screen is transmitted from Rs, the registration client Rc displays this screen and terminates the processing.

Receiving the user authentication symbol information and the server authentication symbol information from U, the registration client Rc transmits this information to Rs.

The registration client Rc transmits this information to Rs.

Receiving the registration completion screen from Rs, the registration client Rc displays this screen and terminates the processing.

The User U:

In order to start the mutual authentication procedure, the user U activates the authentication client T.

When T displays the initial screen, the user U inputs his or her own user ID.

When T displays the ith authentication symbol of the authentication server S and the authentication symbol authentication screen of U, the user U executes the followings.

a. determining a correct answer and an incorrect answer of the server authentication symbol, and inputting the result in T.

b. selecting the ith user authentication symbol of the user himself or herself, inputting the result in T.

In order to start the authentication symbol registration procedure, the user U activates the registration client Rc.

When Rc displays the password authentication screen, the user U inputs the user ID and the password of himself or herself.

When Tc displays the authentication symbol registration screen, the user U inputs the user authentication symbol information and the server authentication symbol information.

Figure 10:
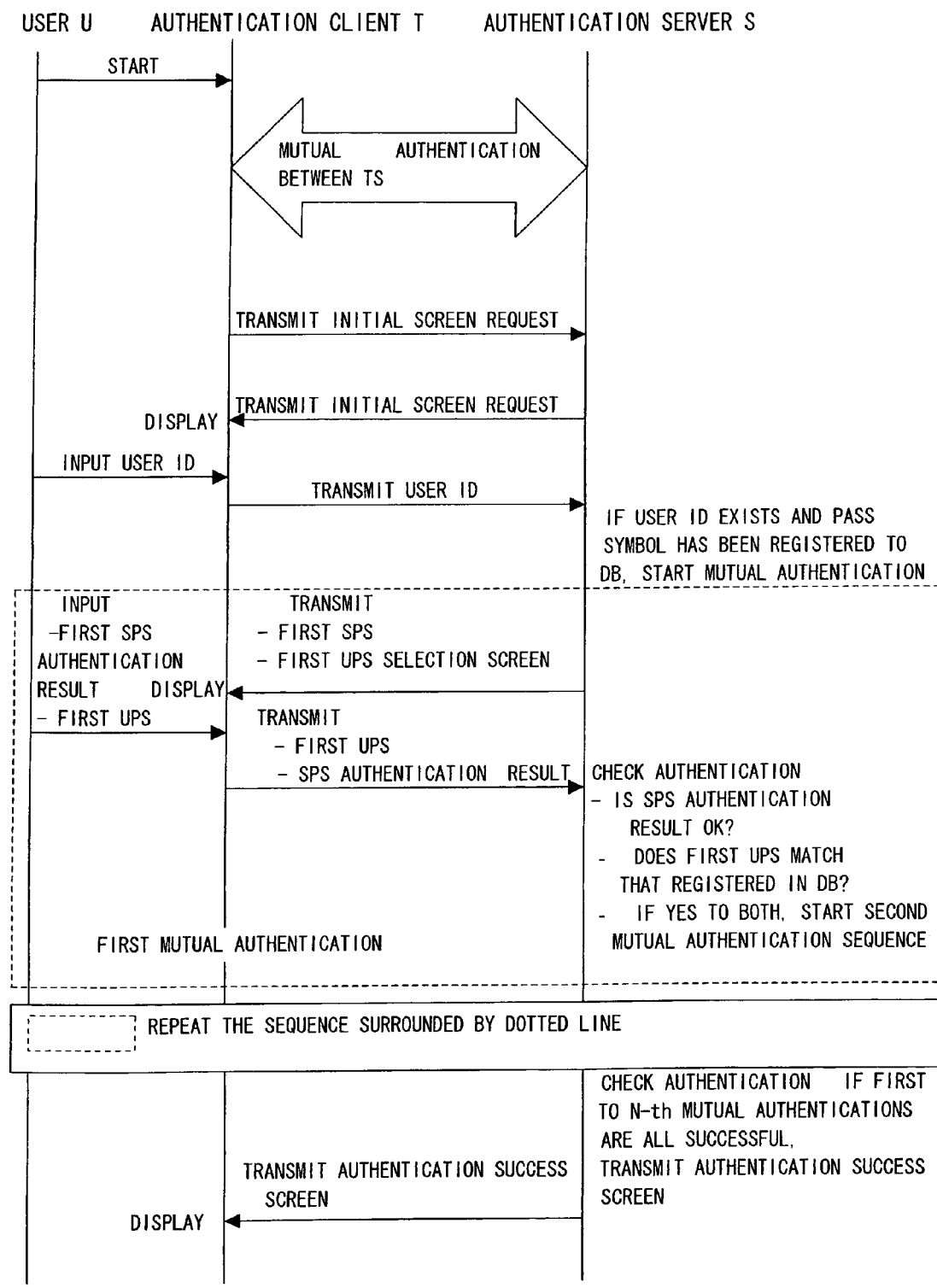
FIG. 10 is a sequence of a mutual authentication phase (when the authentication succeeds).
Figures 1, 11:
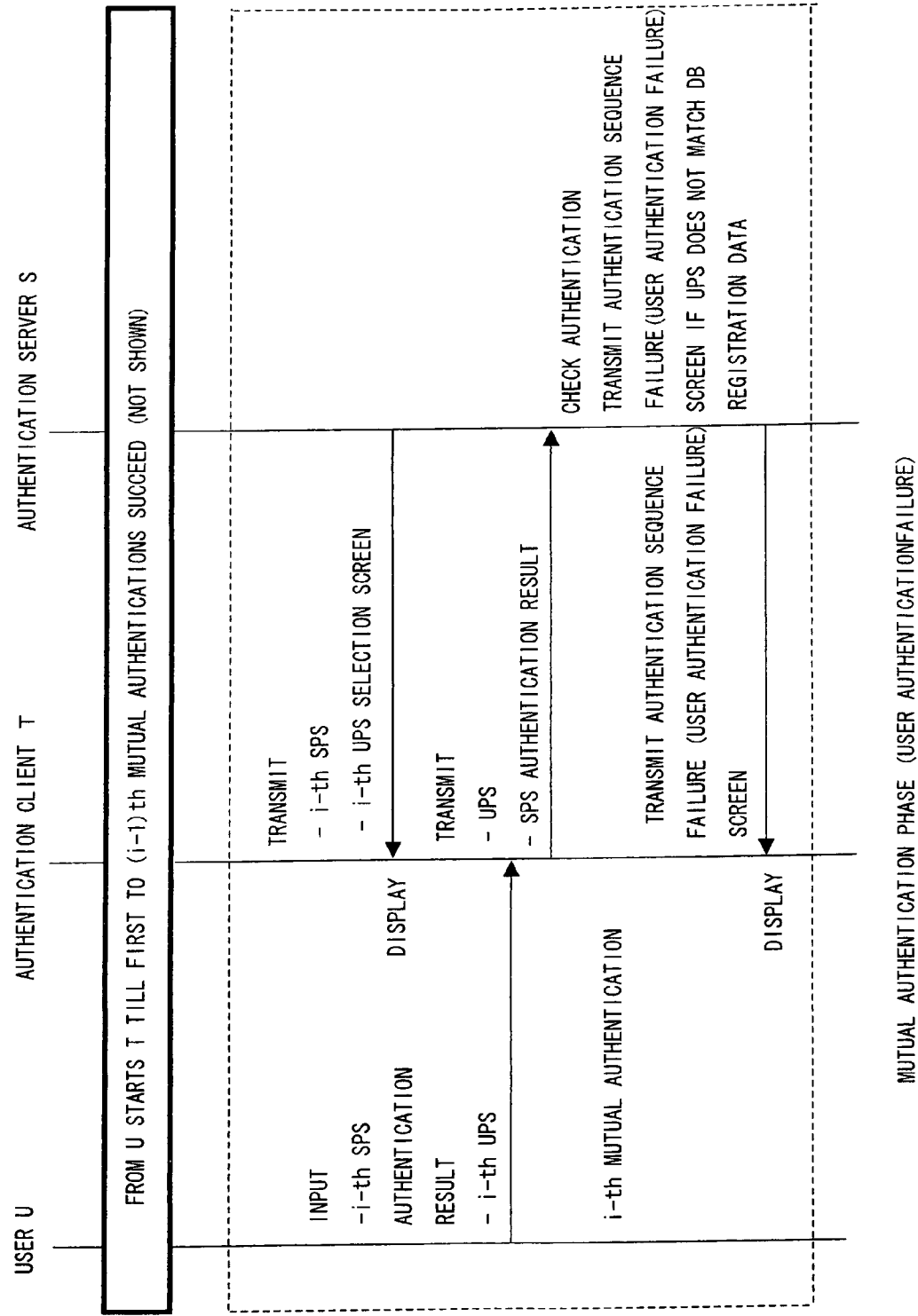
Figures 2, 11:
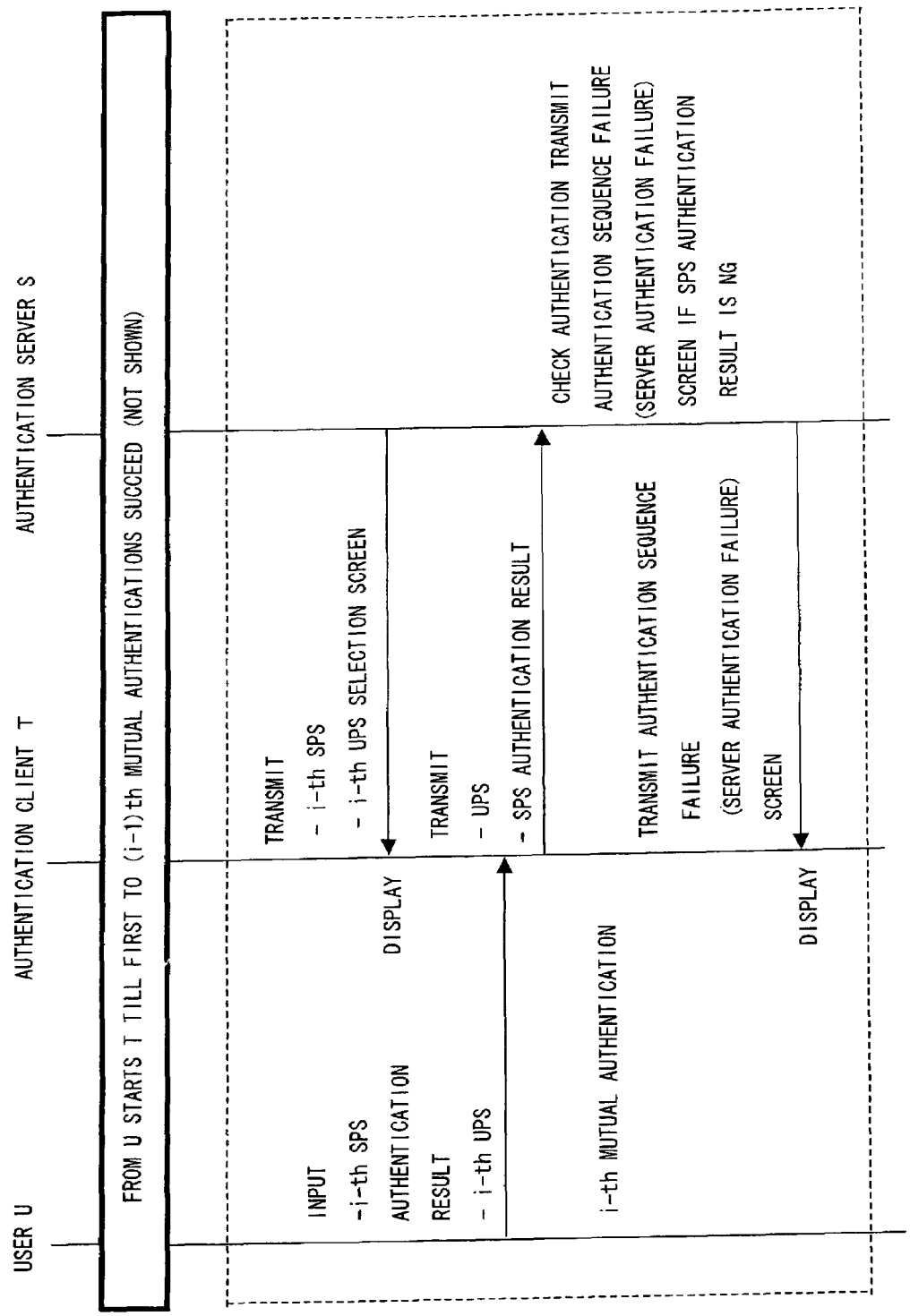

FIG. 10 and FIG. 11 illustrate the mutual authentication sequence specification.

The present system may treat two phases, namely, "an authentication symbol registration phase" to register the information necessary for making the mutual authentication between the user and the server and "a mutual authentication phase" to make the mutual authentication between the user and the server in practice.

FIG. 10 shows the mutual authentication phase (when the authentication succeeds).

FIG. 11-1 shows the mutual authentication phase (when the user authentication fails).

FIG. 11-2 shows the mutual authentication phase (when the server authentication fails).

INDUSTRIAL APPLICABILITY

The present invention has a great utility value as an authentication technology of the user in a system management apparatus (a data management center, a sales management center, and a server for electronic commercial transaction and retrieval of the information or the like). In other words, by carrying out the mutual authentication between the person and the system upon connection of the server as a window of a system management apparatus and the user, the system authentication by the user is carried out in addition to the user authentication by the system at the same time so as to enhance the counter measure against the leakage of the information. Therefore, the present invention is effective particularly for application in utilization of the electronic information and electronic commercial transaction.

What is claimed is:

1. A multi-step mutual authentication system between a user and a system in which an electronic apparatus at a system management side and a terminal device at the user side are connected via a communication path and mutually authenticate a user and the electronic apparatus at the system management side as a target of access by using the system authentication information from a recording medium that is incorporated in the electronic apparatus at the system side and the personal authentication information from a personal input operation of the terminal device operated by the user, wherein two sets of a plurality of data for authentication are registered on the server, said two sets of a plurality of data consist of images, one of the sets being plural images for personal authentication indicating personal authentication information of the user, and the other set being plural images for server authentication indicating system authentication information, and the authentication at the server side using the plural images for the server authentication is performed one by one of said plural images for server authentication and then the authentication at the user side using the plural images for the personal authentication of the user is performed one by one of said plural images for personal authentication after each one of said plural images for server authentication is performed.

2. A multi-step mutual authentication system between a user and a system in which an electronic apparatus at a system management side and a terminal device at the user side are connected via a communication path and mutually authenticate a user and the electronic apparatus at the system management side as a target of access by using the system authentication information from a recording medium that is incorporated in the electronic apparatus at the system side and the personal authentication information from a personal input operation of the terminal device operated by the user, wherein two sets of plural reference symbols are registered on the system, respectively, for the mutual authentication, one of the sets being plural reference symbols for the personal authentication indicating the personal authentication information of the user, and the other set being data for the system authentication indicating the system authentication information; and the authentication at the system side using the plural reference symbols for system authentication is performed one by one and then the authentication at the user side using the data for personal authentication of the user is performed.

3. The multi-step mutual authentication system between a user and a system according to claim 2, wherein the plural reference symbols for the user authentication is configured by a user authentication symbol and the plural reference symbols for the system authentication is configured by a system authentication symbol.

4. The multi-step mutual authentication system between a user and a system according to claim 2, wherein the two sets of reference symbols have the same number of reference symbols for the personal authentication as the reference symbols for the system authentication.

5. The multi-step mutual authentication system between a user and a system according to claim 2, wherein, in the two sets of reference symbols, at least the plural reference symbols for the personal authentication is made into an image using type reference symbol.

6. The multi-step mutual authentication system between a user and a system according to claim 2, wherein, the plural reference symbols for the personal authentication is constituted from an image using sets of reference symbols, each selected as a normal symbol image from the group consisting of plural normal symbol images and plural decoy symbol images; the personal authentication is a memory selection depending on an individual experience; and the selection order of and authentication of each one of the plural normal symbol images is in chronological order of the individual user life experiences.

7. The multi-step mutual authentication system according to claim 2, wherein the communication path comprises Internet.

* * * * *